Feb. 8, 1944.   H. O. SCHJOLIN   2,341,163
CONVERTER CONSTRUCTION AND CONTROL
Original Filed Aug. 20, 1938   5 Sheets-Sheet 1

Inventor
Hans O. Schjolin
By Blackmor, Spencer & Flint
Attorneys

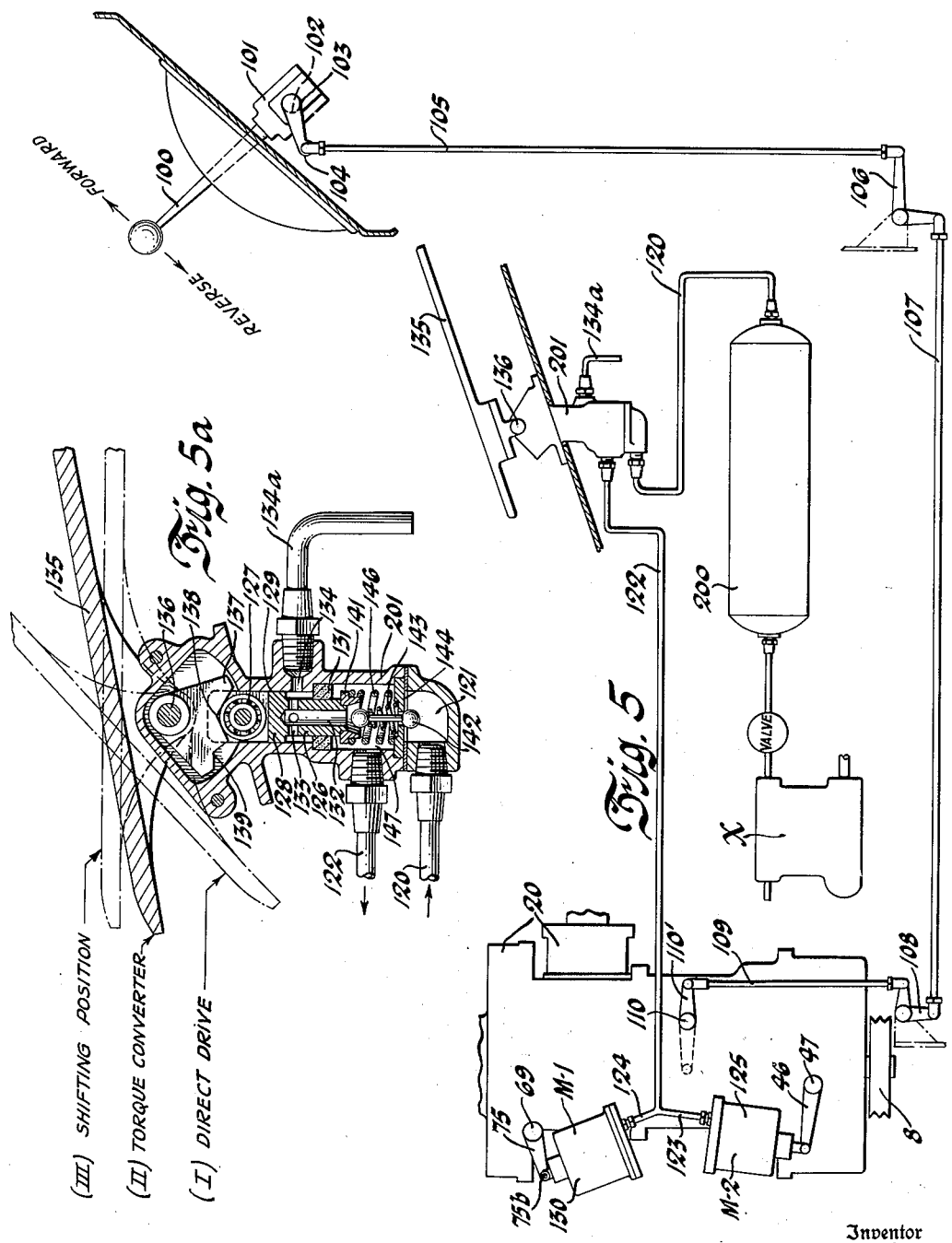

Feb. 8, 1944. H. O. SCHJOLIN 2,341,163
CONVERTER CONSTRUCTION AND CONTROL
Original Filed Aug. 20, 1938 5 Sheets-Sheet 5
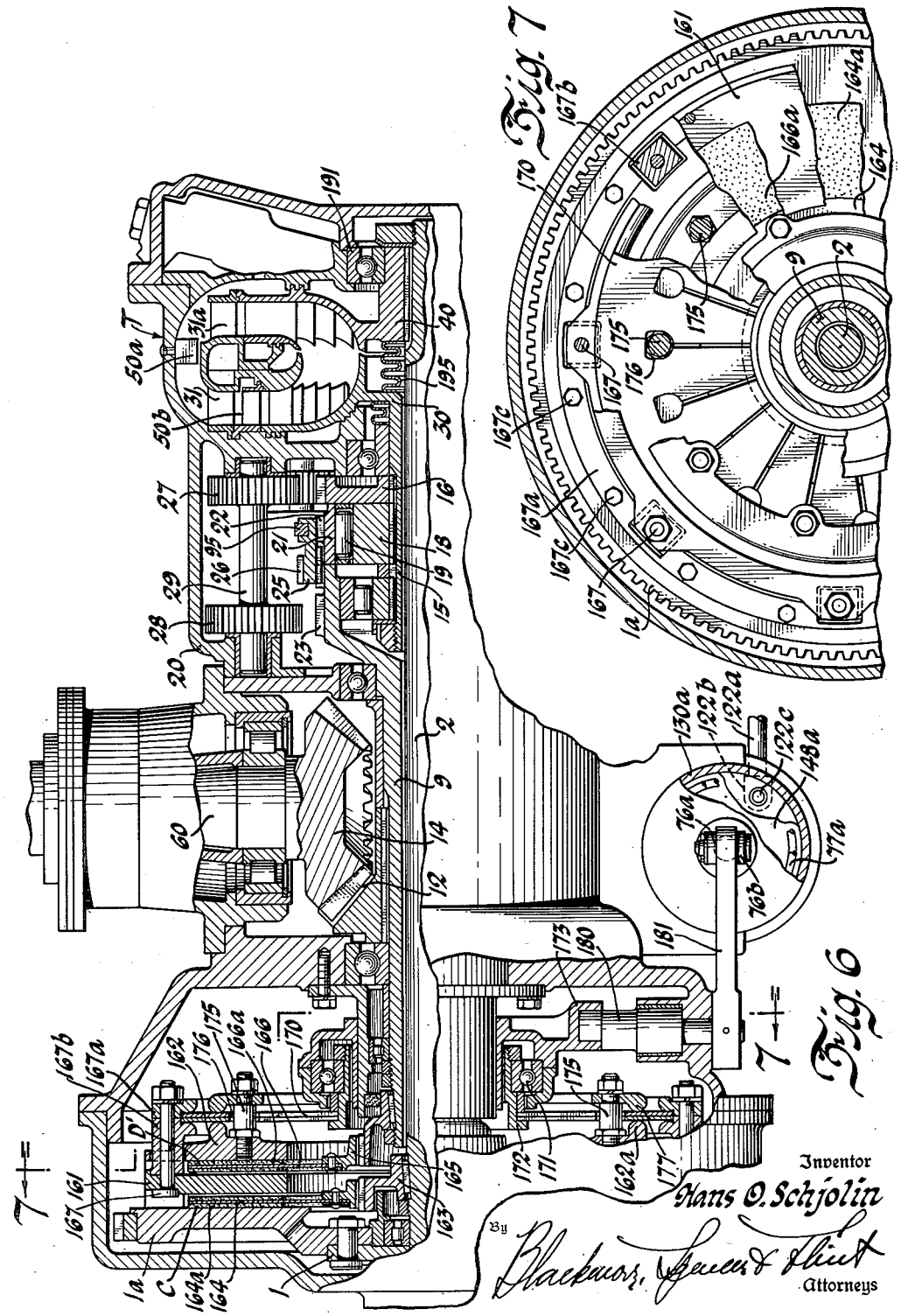
Inventor
Hans O. Schjolin
By Blackmore, Spencer & Flint
Attorneys Patented Feb. 8, 1944

2,341,163

UNITED STATES PATENT OFFICE 2,341,163

CONVERTER CONSTRUCTION AND CONTROL

Hans O. Schjolin, Pontiac, Mich., assignor, by mesne assignments, to General Motors Corporation, Detroit, Mich., a corporation of Delaware Refiled for abandoned application Serial No. 225,860, August 20, 1938. This application October 4, 1940, Serial No. 359,747

14 Claims. (Cl. 192—3.2)

The invention relates to motor vehicles, more particularly those in which is required a compact grouping of the driving mechanism for large vehicles such as passenger busses, trucks, and tractors.

The invention relates specifically to a form of semi-automatic control whereby the driver, through manipulation of a unitary element, controlling single operating means, may compel selective drive at either top ratio, or reduction drive. The invention relates thereunder to control devices in which the will of the vehicle operator in selecting ratio is expressed through the agency of fluid pressure servo means, and in particular to servo systems utilizing a single conduit to provide multiple operating characteristics.

The invention likewise relates to a method of organization of the elements of a power plant and associated hydraulic driving mechanism whereby a minimum of points for leakage of hydraulic liquid is attained.

The invention also relates to grouping of power actuated ratio determining mechanisms commonly controlled from single means, affording economy of parts and surety of control.

A further advantage of the invention lies in the demonstration of the method of controlling clutches used for selective ratio engagement, involving a single loading member selectively operated for engaging one or another clutch means. In this demonstration I show a hydraulic torque converter providing infinitely variable drive in the lower speed ratios and control means therefor embodying interlinked mechanism for establishing converter drive or by-pass drive directing coupling the power to the load.

Additional advantages appear in the application of interlocking driver controls for the described forms of mechanism whereby prevention of wrong motion is achieved; wherein there is a simple coordination of foot and hand operated elements; and wherein the interlocking means control fluid pressure servomotors compelling change of drive between the converter and drive coupling means at the will of the operator.

The subject matter of the present invention is related to my copending application United States Serial Number 189,596, filed February 9, 1938, and maturing as Letters Patent U. S. No. 2,272,434 on February 10, 1942.

Further objects and advantages appear in the following detailed description given in connection with the accompanying drawings, wherein:

Figure 5 is a schematic diagram of the operator controls arranged to operate the shifter mechanisms of Figure 2.

Figure 5a is a sectional view of the operator control means for the servo and clutch devices of Figures 2 and 6.

Figure 2:
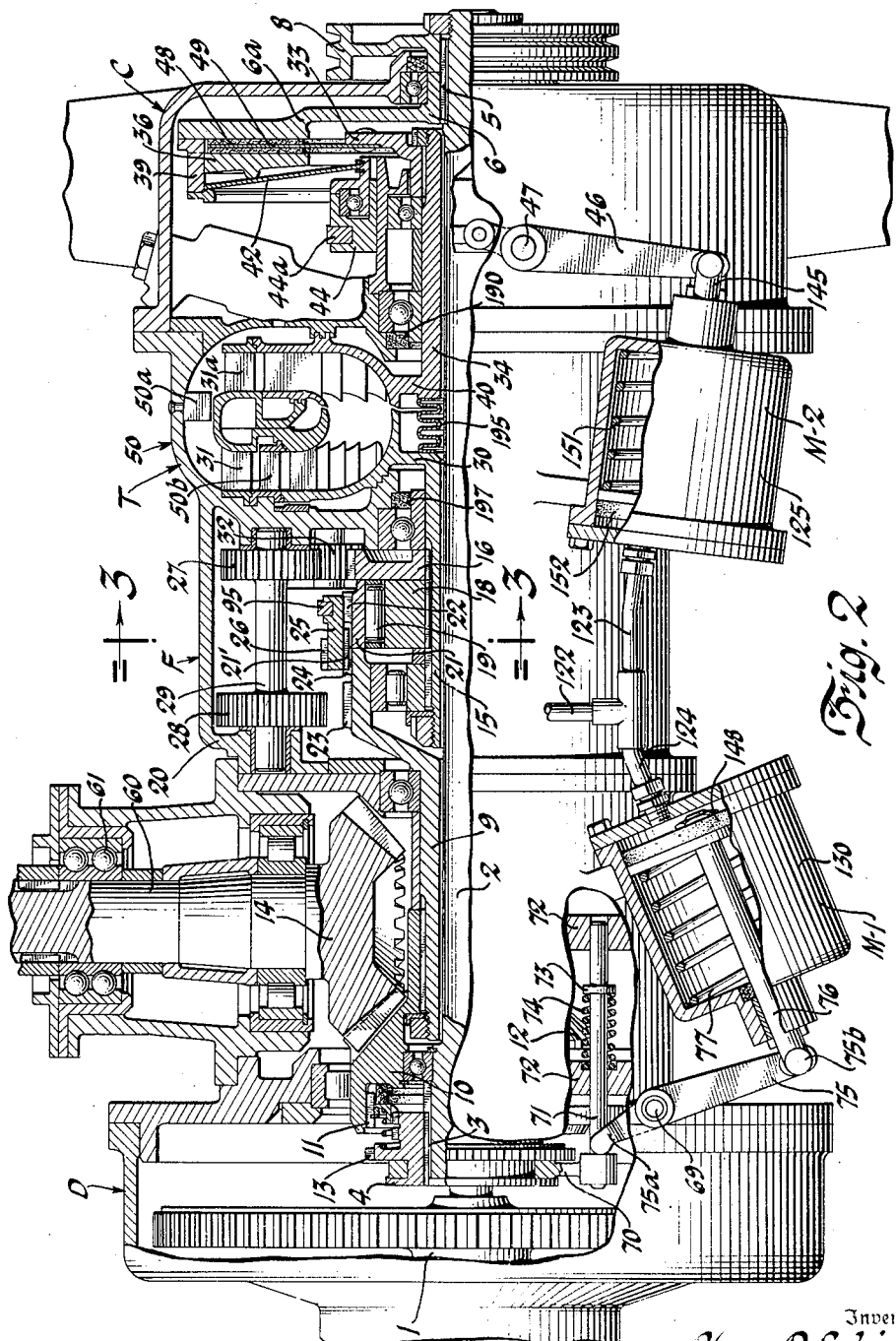
Figure 2 is a longitudinal section of the power plant of Figure 1 taken in part section in the longitudinal plane.

Figure 6 is a modified form of the gearing and converter arrangement of Figure 2 in which the clutches C and D are of the same type, commonly operated and controlled. Figure 7 is a partial section elevation at 7—7 of Figure 6 of the operating mechanism for the clutches C and D' of Figure 6. The arrangement of Figure 6 embodies the sealing feature noted in the preamble.

Figure 8:
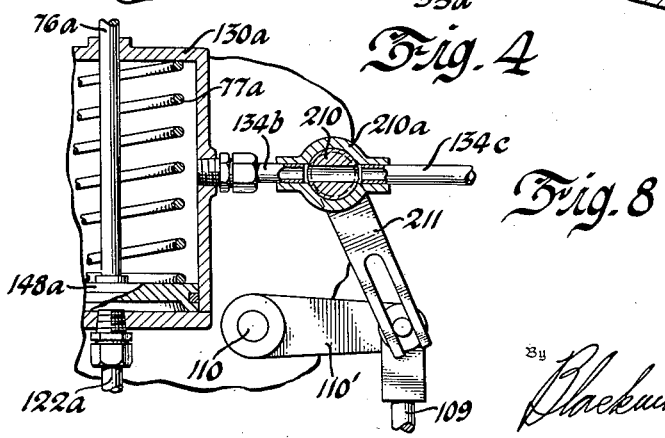

Supplementary Figure 8 is a sectional view of the single operating cylinder of Figure 6 showing the method of obtaining positive neutral.

Figure 1:
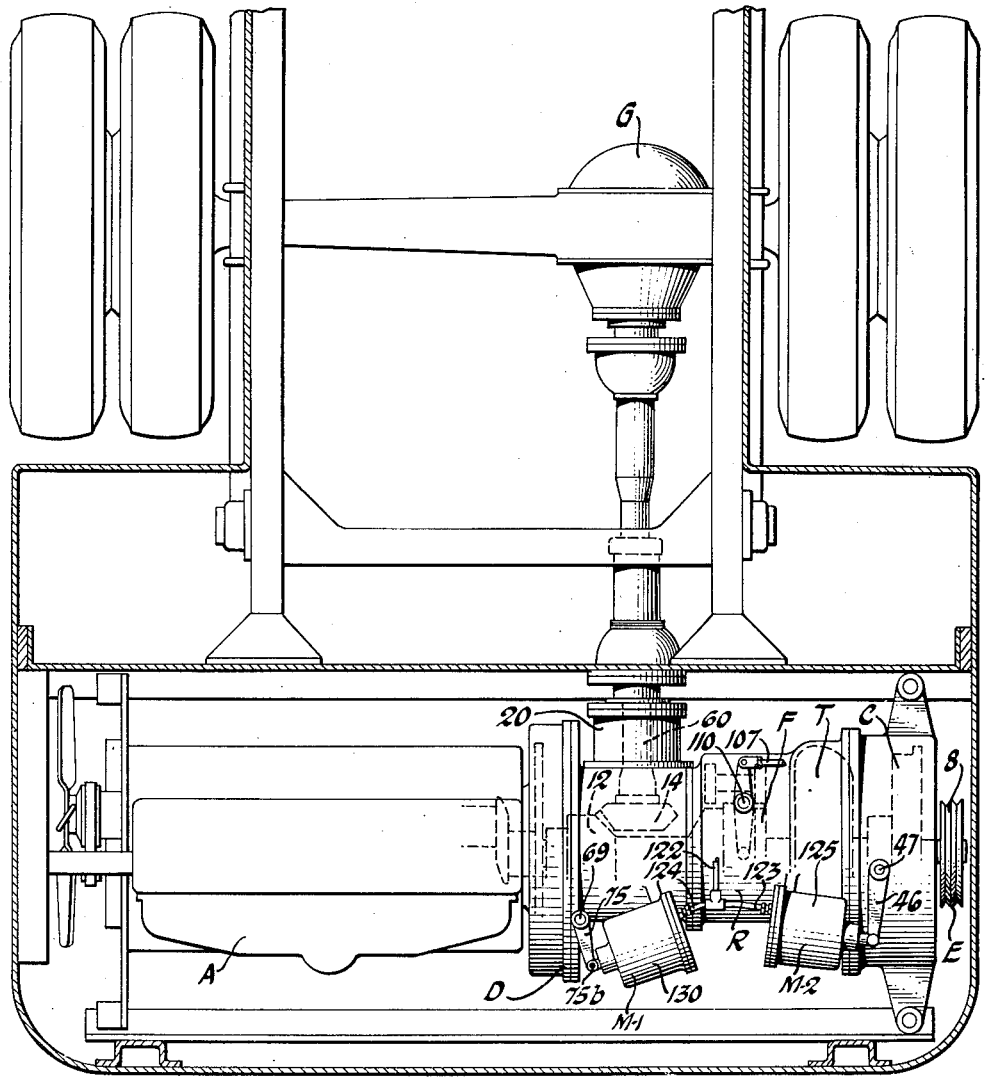
Figure 1 is a schematic view of an installation of the driving portion of my invention, applied to a motor bus chassis, with the power plant arranged transversely at the rear.

Referring particularly to Figure 1, the drive arrangment is shown as installed in the rear of a passenger bus with the primary power plant arranged transversely and the output drive in the fore-and-aft plane of the vehicle connected by a short jackshaft 60 to the conventional differential gear and axle drive to the rear wheels. The primary power plant comprises an engine A of suitable type, a clutch C, a clutch D, a turbine type torque converter T as a variable speed transmission, a gear assembly R, an overrunning device F, and an accessory drive mechanism E all mutually coaxial.

The propeller shaft 60 extends forwardly with respect to the vehicle, and downwardly, from a point intermediate the engine A and the torque converter unit T, driving a conventional differential gear G.

In Figure 2 the engine crankshaft is shown at 1, mounted to rotate drive shaft 2 splined at 3 for slider 4, and splined at 5 for clutch hub 6 and flanged fitting 8 which drives the accessory units.

Sleeve 9 mounted on proper bearings surrounds shaft 2 and is attached to or integral with member 10 having internal ring of teeth 11 and external bevel teeth 12. Teeth 13 of slider 4 mesh with teeth 11 so that member 10, when the jaw clutch thus described is engaged, will be driven at engine speed.

Output jackshaft 60 rotates on bearing 61 in casing 20 and is fixed to or integral with bevel gear 14 meshing with gear 12, transmitting the driving of sleeve 9 to the driving wheels of the vehicle as shown in Figure 1. Sleeve 15 concentric with sleeve 9 is mounted to rotate about shaft 2 and carries affixed gear 16 and roller clutch member 18, the inner end terminating in turbine element 30, which is the output member of the torque converter unit T.

Roller clutch member 21 is externally splined at 22, the teeth 23 in splines 24 of sleeve 9 being aligned axially and radially therewith. Slider 25 is splined internally at 21'. When the teeth 21' are in mesh with the teeth 23 of the sleeve 9, the output member 21 of the roller clutch assembly F is released.

Figure 3:
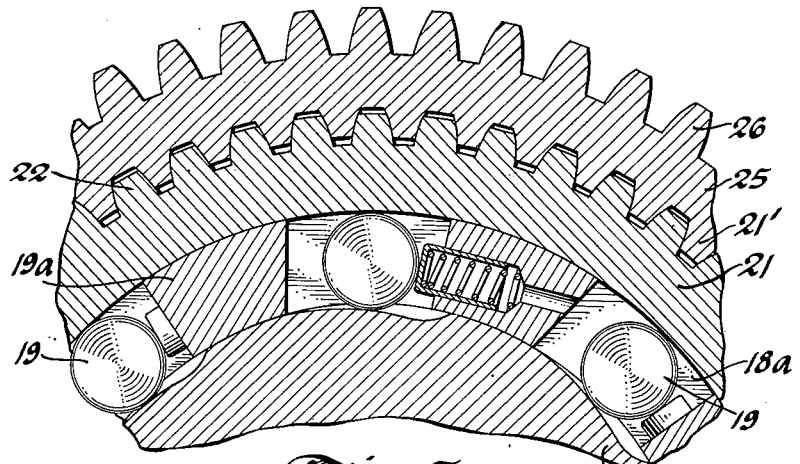
Figure 3 shows the sectional detail of the mechanism at 3—3 of Figure 2, with the shifter means engaged for forward drive.

When slider 25 is moved to the left, or toward the engine, its teeth 26 also mesh with teeth 28 of gearbody 29 rotating in bearings in the casing 20. Teeth 27 of member 29 constantly mesh with reverse idler gear 32, which in turn meshes with gear 16. When slider 25 is in the right-hand position, the driver from sleeve 15 is carried by roller clutch member 18 and 21, slider 25, teeth 23 and 21', and sleeve 9. When it is in the left-hand position, the drive is through gears 16—32, gearbody 29, slider 25, and sleeve 9, yielding reverse drive. Figure 3 shows slider 25 meshed with teeth 22, as when in forward drive the roller clutch F is made active.

Hub 6 and flange 6a upon which is formed support 39, delivers the power of the engine from shaft 2, so that presser plate 36 mounted on 39—6a may engage clutch driven disc 49 having facings 48. Hub 33 carries disc 49 and is splined to hollow shaft 34 connected to or integral with the impeller 40 of the converter T.

Converter blades 50a and 50b shown in elevation in Figure 2 constitute reaction supporting means for the converter T, and may be attached to or integral with the casing 20.

The spinning of impeller 40 circulates the liquid contained in the converter compartment so as to impinge on the blades 31a, and the blades 50 convert negative to positive force by causing rotation of blades 31. Specialized forms of the blades and their distribution within the converter compartment are not involved in this invention. The net result is to apply rotational energy to the rotor 30 attached to sleeve 15, the force being delivered at variable speed ratios.

Such turbine devices are well known in the art, and are capable of providing multiplication of torque over predetermined speed range.

The three elements of the turbine device, impeller 40, the reaction member 50, and rotor 30, provide torque multiplication so as to impart infinitely variable speed from sleeve 15 to sleeve 34, which revolves at engine speed when clutch C is engaged. As previously described, the power is delivered to jackshaft 60. The infinitely variable speed ratios obtained through the converter T cover a predetermined zone of available ratios depending upon the load and speed ranges required for the service of the vehicle, and no invention is herewith claimed for the torque converter, the form of unit being well known.

With the engagement of clutch D the drive is transmitted from the engine to shaft 60 at the fixed ratio of gears 12 and 14, which may be 1-1 or some other ratio, depending upon the requirements for the drive. At this time clutch C is disengaged, whereupon sleeves 34 and 15 and both elements 40 and 30 of the converter may come to rest, the roller clutch F permitting sleeve 9 to overrun sleeve 15.

Figure 3 is a section of a portion of the roller clutch assembly F. The external member 21 is toothed to mesh with slider 25 and the internal member 18 has ground one-way cam surface 18a, rollers 19 carried in cage 19a, serving to lock the drive for one direction of relative rotation and to release it for the other. Roller cage 19a is fixed to rotate with the inner member 18, and has limited lost motion with respect thereto.

Slider 25 in mid-position demeshes teeth 21' from the teeth 22 of member 21, but is partially meshed with teeth 23. This permits the slider 25 to give full release of the roller clutch F when the controls are placed in reverse position.

Figure 4:
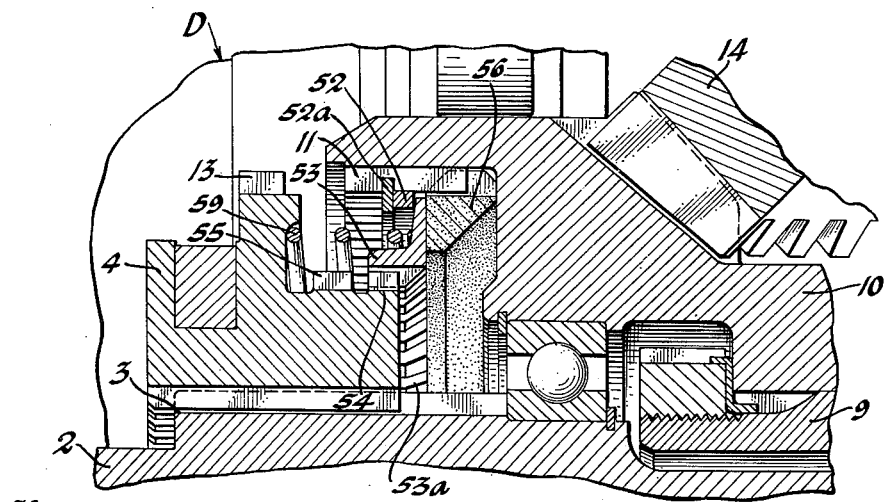
Figure 4 is an enlarged sectional view of the direct drive clutch D of Figure 2.

Figure 4 describes the direct drive clutch D of the jaw clutch type. Shaft 2 is splined at 3 to engage mating teeth cut on slider 4 which carries direct drive teeth 13. Member 10, which is arranged to drive bevel gear 14, is extended and enlarged so that its internal ring of teeth 11 may mesh with teeth 13 of slider 4.

On a portion extending to the right of slider 4 are cut two rings of teeth, 54 and 55. Teeth 54 carry balking ring 53 having limited rotational lost motion in its splining through the teeth 53a. Piece 53 is shaped to bear against collar 56 held on the inner portions of teeth 11. Spring 59 exerts constant tension between the slider 4 and the ring 53 so that when teeth 13 and 11 are disengaged there is always present a slight frictional force between elements 53 and 56.

The upper lip of member 53 is held by spacer 52 and lock ring 52a, preventing the backing off of ring 53 from contact with collar 56.

When the slider 4 is stressed for engagement of teeth 13—11, the force of spring 59 is augmented. The differential rotations of shafts 2 and 10 cause ring 53 to be biased rotationally in one direction or another constantly with respect to teeth 55, so that the mechanism tends to reject mesh, the stub ends of teeth 53a blocking teeth 55 until synchronous speed is reached.

This blocking action occurs whenever the engine speed is greater or less than the speed of shaft 10. As soon as synchronism is reached, the biasing force between member 56 and ring 53 no longer exists; therefore teeth 55 may pass freely into the spaces of teeth 53a and complete mesh of teeth 11 and 13 then occurs without clashing. The particular form of constantly loaded synchronizer mechanism in combination with the control arrangement for picking up the drive in direct is believed novel and useful.

The operating mechanism for clutch D of Figure 2 consists of yoke 70 of gearbody 4 fixed to shaft 71 mounted to slide in bosses 72 of casing 20, the shaft collar 73 affording a seat for tension spring 74 arranged to load to a predetermined degree, the clutch D for engagement. Cross shaft 69 supported in the casing 20, carries arm 75 having finger 75a adapted to bear against the enlarged end of fork 70 where it is fastened to shaft 71. The pivot end 75b of lever arm 75 is joined to piston rod 76 of servomotor M—1, the cylinder 130 of which is attached to the casing 20, and fed by air pipe 124. Biasing spring 77 normally holds piston 148 and rod 76 in the position shown in Fig. 2, unless air pressure is admitted to the cylinder 130, whereupon lever 75 is rocked clockwise, the finger 75a relieving the force of spring 77, so that the direct drive clutch loading spring 74 can initiate the action leading to direct drive clutching by teeth 13 and 11.

The operating mechanism of clutch C of Figure 2 consists of yoke 44a engaging bearing collar 44 which limits the movement of disc spring 42 for loading presser plate 36. Cross shaft 47 carries lever 46 engaging fork 44a, and pivoted to piston rod 145 of servomotor M—2. As will be described, the servo system is arranged to actuate both servomotors M—1 and M—2 from a common control means, for prevention of wrong motion, and for economy of parts.

Servomotor cylinder 125 mounted on casing 20, houses piston 152 attached to rod 145, biasing spring 151 being normally effective to load clutch C unless fluid pressure is admitted to cylinder 125 from branch pipe 123 connected to main air line 122.

As will be clearly understood from the following description, the fluid pressure main line 122 serves the dual purpose of establishing the loading force for direct drive while relieving the turbine clutch C. This simultaneous action shortens the shift interval and assures positive relief of reduction drive before the direct drive torque is established through clutch D.

Figure 5 is a schematic representation of the arrangement of the controls between the driver's compartment, located at the front end of the vehicle, and the power plant compartment, located at the rear end of the vehicle.

Conveniently placed to the hand of the operator is master shift control handle 100 pivoted in fitting 101 attached to the dash. Shaft 102, supported in the fitting, terminates in arm 103 pivoted to clevis 104 attached to vertical rod 105. Below the main floor line bellcrank 106, pivoted to the vehicle frame, is attached to rod 105, the opposite arm being attached to longitudinal rod 107 so as to convert the reciprocal movement of the handlever into fore and aft movement of the rod 107.

The power plant, including the power transmitting arrangements, is shown in outline at the left-hand to the drawing, the contour being in accordance with the showing of Figure 1.

Projecting toward the eye of the observer is shaft 110, likewise shown in Figure 1, and to it is attached arm 110' outside the casing 20 pivoted to rod 109. Bellcrank 108, pivoted to the frame of the vehicle, transmits the movement of rod 107 to rod 109, so that the shifting movement of the handlever 100 is converted to rocking movement of arm 110' and shaft 110, which, as will be seen from Figure 1, may mesh slider 25 with the teeth 21' of ring 21 for forward drive, and mesh teeth 26 with teeth 23 and gear 28 for reverse drive.

It will be observed that all shifts of the handlever 100 will occur at times when the engine is idling or rotating at low speed.

Air supply tank 200 is shown schematically in the figure, and is maintained with the customary pump X and automatic valve. The main pressure line 120 delivers constant air pressure to space 121 of valve casing 201, the delivery line 122 of valve casing 201 passing toward the rear of the vehicle, where it is connected to two pipes 123 and 124 feeding servo cylinders 125 and 130.

The shift control pedal 135 is pivoted to the floorboards of the driver's compartment in an extension of the valve housing 201 as shown in Figure 5. The pedal shaft 136 has affixed cam 137 with notches 138 and 139 for two positions, the limiting portions of the inner part of the casing 201 compelling the pedal to occupy normally one of the two positions indicated. However, as will be described later, the pedal 135 may be pressed a slight distance downward beyond the position shown in Figure 5a for the purpose to be described in detail following.

In the most elevated position of the pedal 135, control over the transmission apparatus is required to establish direct drive, which will be described as position I. As the porting of the valve mechanism is so arranged with respect to pedal movement, both servo cylinders 125 and 130 are supplied with air pressure from tank 200. The second normal position (II) of pedal 135 is for the purpose of connecting the torque converter unit by engaging clutch 36 and 49 of Figure 2, the valve mechanism in this position being closed so that neither of cylinders 125 and 130 obtain air pressure from tank 200, but are exhausted to atmosphere.

In position III of pedal 135, the valve mechanism is permitted to deliver a momentary increase in air pressure to line 122 and to both of cylinders 125 and 130 for a purpose to be described later.

Valve member 126 is affixed to roller 127 and may occupy a high position when the roller is in notch 138 of cam 137, and may occupy a lower position when the roller is in notch 139 of cam 137. These two positions correspond to torque converter and direct drive respectively. The boss 128 of valve 126 adjacent to roller 127 is fitted to bore 129 of casing 201 and the stem portion of the valve 126 slides within extension 131 of casing 201. Valve member 126 is drilled out longitudinally at 132 and at 133. When the valve is pressed down, exhaust port 134 may no longer communicate with the passage 132, and dumbbell valve 142 closes off release of air by seating in 141.

Valve seat 141 is centrally ported to form a seal with the spherical face of dumbbell valve 142, the other end of which may likewise prevent air from passing through longitudinal passage 132 of valve member 126 to exhaust port 134. Conical spring 143 is seated under the head of dumbbell valve 142 so that the force of the spring may assist the air pressure from space 121 to seat the valve 142 against the valve seat 144. The inner end of the stem of valve member 126 carries spring seat 141 pressed upward by spring 146, which normally exerts compression by resting against the inner face of the valve seat 144. In the position shown in Figure 5a, the roller 127 is seated in notch 138 of cam 137, and therefore servo pressure line 122 may drain through longitudinal passage 132 in valve member 126 to exhaust port 134.

The operator may depress his heel on the rearward portion of control pedal 135, raising the pedal to position I and causing roller 127 to occupy notch 139 so that the upper end of the dumbbell valve 142 tends to seal the longitudinal passage 132 and the lower portion of the dumbbell valve is thrust downward and unseats from seat 144, permitting reservoir air pressure to pass through to the inner chamber 147, thence through servo line 122 and to cylinders 125 and 130 of Figure 2.

It is stated previously that in the third position a momentary increase of air pressure could be delivered to the cylinders by depressing the pedal to position III. Under these circumstances the right hand portion of cam 137 may compel a slight unseating of the dumbbell valve 142, the operator's foot pressure being reacted against by both of springs 143 and 146.

The effect of this operation is to permit spring 77 to load the direct drive slider 4 of Figure 4 by the action of air pressure in cylinder 130. The friction drag element 53 shown in Figure 4 is being constantly loaded; therefore the balking action described preceding in this specification is exerted.

The momentary increase in air pressure has the effect of releasing the converter clutch 36 and 49 so that the turbine connected parts may cease to spin. The handlever 100 may then be moved to "forward" position, shifting the slider 21 to couple the external ring 21 of the roller clutch to the output connected shaft 9. This operation only requires half a second.

When the pedal 135 is relieved of the foot pressure, it springs back to position II, the air pressure being immediately cut off, the converter clutch C being re-engaged, and drive may proceed from here on through the torque converter unit T and through the roller clutch F to shafts 9 and 60.

The operator may manipulate the ratio control pedal 135 at any time to move it between positions I and II, while driving forwardly, it being required, however, that a momentary release of the accelerator be made in order to relieve the driving torque on the teeth of the direct drive jaw clutch 13 and 11 so that the biasing force of springs 77, shown in Figure 2, may become effective to set up disengagement.

The valve control in position II relieves the air pressure which otherwise is exerted in holding the converter clutch C disengaged, and the biasing spring 151 located in cylinder 125 may shift the disc spring collar 44 to the right, as shown in Figure 2, to apply the drive of the engine to the torque converter T, which may now be brought up to operating speed and begin to deliver torque through the roller clutch F to the output or load shaft when the driving parts come up to the speed of the output shaft.

When the vehicle speed or road conditions permit, the driver may simultaneously release the engine accelerator pedal and rock the ratio control pedal 135 with the heel to position I, which opens the valving 142 so as to admit compressed air to both cylinders 125 and 130. This releases the converter clutch C and loads the jaw clutch D for direct drive.

Since the engine under these circumstances is decelerated, the engine connected shaft 2 and the jaw clutch member 11 are approaching synchronism so that the slider 4 being preloaded by the air pressure, may move on through to complete mesh of teeth 13 and 11 when the balking action of the friction element 53 ceases. This occurs when reversal of relative motion takes place. It should be observed that the operator may continue to drive at will in direct without freewheeling, and with the turbine connected parts at rest.

The control actions for reverse drive are the same as for starting and forward except for the direction of the movement of the handlever 100 and the connected parts. More specifically, the utilization of the third position of servo control pedal 135 for administering a momentary increase of air pressure to cylinders 125 and 130, is used, so that the shift to reverse gear is as silent as the shift to forward running through the converter T.

Figure 6 shows a modification of the construction of Figure 2 in which the engine connected shaft 1 is joined to output jackshaft 60 by direct drive clutch D' of the friction type, and in which clutches C and D' are grouped together at the engine end of the transmission casing 20. This permits the converter unit T to be installed in a sealed housing, greatly simplifying the problem of enclosing a converter compartment against leakage.

Engine connected shaft 1 and flywheel 1a support presser plates 161 and 162. Transmission shaft 2 carries splined hub 163 and clutch disc 164 having facings 164a. Rotating on shaft 2 is hollow shaft 9 carrying splined clutch hub 165 attached to clutch disc 166 having facings 166a. Shaft 9 may drive bevel gear 12 meshed with bevel gear 14 attached to shaft 60 either through clutch D', directly driven by the engine, or through clutch C through the torque converter T. Clutch control mechanism is arranged to provide alternate gripping of either of clutch discs 164 or 166 to either of shafts 2 or 9 respectively.

Fittings 167a bolted to the flywheel at 167c are arranged to restrain the external edges of compound disc spring 170, the inner edges of which may be shifted to the right or to the left by a movement of bearing 171 and sleeve 172 longitudinally through eccentric yoke 173 moved from outside the gearbox. The fulcrum action occurs through studs 176 and members 167a.

Presser plate 162 carries studs 175 passing through apertures 176 in disc 170, the studs carrying fulcrum ring 177. A fulcrum portion 162a of presser plate 162 affords bearing opposite the fulcrum point of ring 177.

When the yoke 173 slides the bearing member 171 to the left, the spring disc 170 exerts a pull on plate 161 through studs 167 against presser plate 162, clamping clutch disc 166 for rotation with the flywheel 1a. This operation establishes direct drive while allowing the torque converter to idle.

When the yoke 173 and collar 172 are shifted to the right, the fulcrum at 177 and 162a reverses the force of studs 167 and force is transmitted through fittings 167a to clamp clutch disc 164 between flywheel 1a and presser plate 161. This action disengages clutch D' and couples clutch disc 164, establishing turbine drive between the engine shaft 1 and hollow shaft 9. It will be seen that this clutching arrangement is operable in the same manner as that of Figure 2, a simple rocking means for shift lever 181 attached to eccentric 180 being the only requirement.

It should be noted that the disc spring assembly and operating mechanism rotate with flywheel 1a, and that the longitudinal motion is applied through yoke 173 and through bearing 171 attached to collar 172. As will be described, the placing of the eccentric 180 in a mid-position disengages both clutches C and D'.

The lever 181 attached to eccentric shaft 180, outside the gearbox, is arranged to occupy three control positions, establishing converter, direct drive or neutral according to the setting of the mechanism of Figure 8.

It will be noted that in the arrangement of Figures 6 and 7, only one servo cylinder assembly is needed to perform the work of shifting drive between clutch C and clutch D.

Lever 181 is pivoted to piston rod 76a at yoke 76b, the piston 148 sliding in cylinder 130a mounted on the casing 20. Biasing spring 77a normally loads piston 148a to the end of the cylinder farthest from the eye of the observer in Figure 6. At the far end, pipe fitting 122b opens into the cylinder 130a at 122c, and is joined to pipe 122a, connected to the valve control arrangement of Figures 5 and 5a in place of pipe 122. The single cylinder arrangement provides a useful saving in parts and in sureness of operation.

When fluid pressure is admitted to pipe 122a from the valve control of Figure 5a, the clutch D' is loaded and the clutch C unloaded. When it is relieved by the valve 126 and 142, spring 77a shifts the piston 148a to the far end of the cylinder 130a, causing the leverage system of Figures 6 and 7 to unload clutch D' and to load clutch C for driving through the converter T.

In Figure 8, a supplementary pipe 134b is shown, connected to a relief valve 210 operated by lever 211 and by rod 109 of Figure 5, so that when the hand lever 100 is placed in neutral position, the air pressure fed to pipe 122a by valves 126 and 142 is blown off at the mid position of piston 148a in cylinder 130a. This establishes a balance between the force of spring 77a and the air pressure in cylinder 130a such that the clutch operating lever 181 and connected parts are positioned for unloading both clutches C and D. This provision of a positive neutral control is not absolutely necessary for idling with no-drive, since the engagement of clutch C, while spinning the converter impeller 40, does not, at ordinary engine idling speeds, furnish sufficient torque to apply other than a small drag component, which, when the vehicle brakes are lightly applied, cannot cause the vehicle to creep forward, even if the gearing be connected for forward or reverse drive.

The above described system has the following advantages:

a. The driver need not use his hands for shifting ratio, except for initiating drive, and for shifting to reverse. He need only use the master shifter pedal—and the regular accelerator and brake pedals. The elimination of the clutch pedal is of utility.

b. The removal of the customary controls clears the space about the driver, who, in a bus, may have to make change and operate the bus door.

c. The range of speed at which the shifting action is required is governed entirely by the judgment of the driver, based on his schedule, the bus load and the driving conditions.

d. Synchronization of the direct drive jaw clutch occurs easily under all operating conditions, because of the preloading and control arrangement described.

e. The drive of the engine is automatically released at idling of the engine, and it is difficult to stall the engine since the torque characteristic of the converter diminishes at engine stalling speeds.

f. The driver does not have to set the hand lever in neutral with each vehicle stop, and can pick up drive in "low" by a mere rocking of the master control pedal.

The invention is described in specific form in the present embodiment, and it is to be understood that this is purely explanatory and not to be taken in any limiting sense, since various changes in the parts, construction and operation may be effected without departure from the full intent and scope of the invention, as defined in the appended claims.

I claim:

1. In motor vehicle controls, an engine connected shaft, a load shaft, a fluid torque converter, a clutch adapted to join said shafts at synchronous speed only, biasing means for loading said clutch, a servo device normally adapted to oppose the action of said biasing means, including fluid pressure actuated means arranged to overcome the opposition of said device for permitting said biasing means to load said clutch, a second clutch adapted to connect said shafts through said torque converter, fluid pressure actuated means arranged to shift said second clutch into and out of engagement, and a manually operated control valve connected to both said means effective to establish loading of said first named clutch while disengaging said second clutch, and effective to engage said second clutch while unloading said first named clutch.

2. In power operated control devices for motor vehicles, an engine, a driving mechanism comprising a fluid torque converter arranged to drive a load shaft, clutching means adapted to connect said engine directly with said load shaft or to connect the engine and load shaft indirectly through the said torque converter, fluid pressure means supplied from a stored energy source operative to alternate the actuation of said clutching means, a valve adapted to direct the fluid pressure of said source to said fluid pressure means, and a manual control connected to said valve movable into alternative positions wherein said engine drives said load shaft directly through said clutching means, or indirectly through said clutching means and said fluid torque converter.

3. In vehicle controls, an engine, a load shaft, a fluid turbine torque converter adapted to couple said engine and said shaft, a clutch arranged to couple said engine and load shaft directly, a servo motor for actuating said clutch, a second clutch arranged to connect said torque converter to said engine, a servo motor for actuating said second clutch, fluid pressure means effective to operate said servo motors controlled by a single valve, a common fluid pressure pipe joining said means with said servo motors, and a manual control for said valve movable into one of two positions compelling actuation of the first of said clutches by the first named servo motor while the second of said clutches is disengaged, and compelling actuation of the second of said clutches by the second said servo motor while the first named clutch is disengaged.

4. In controls for power operated gearing, a power shaft and a load shaft, a first clutch including meshing jaw members and adapted to couple said shafts at synchronous speed only, a second clutch adapted to couple said shafts through torque conversion means, servo motors for actuation of said clutches, a fluid pressure main, and a valve arranged to control the flow of fluid pressure from said main to said servo motors, movable to one position for actuation of the pistons of said motors, to a second position for relief of pressure from said motors, and to a third position in which a temporary surge of fluid pressure is delivered to one of said motors for facilitating meshing engagement of the first of said clutches.

5. In combination, an engine connected to a power shaft, a load shaft, a variable speed transmission comprising a fluid torque converter adapted to transmit drive between the shafts, clutching means for connecting said transmission to drive therebetween, further clutching means for connecting said shafts directly when said first named means is disconnected, fluid servo motor devices for operating both said means, a control mechanism for selecting the operation of said devices upon said means including a valve, and a manually operable pedal controlling said valve effective to cause the change of drive from either of said means to the other of said means at the will of the operator.

6. In motor vehicle drives, in combination, a power shaft, a load shaft, a variable speed transmission coupling said shafts comprising a reduction speed hydraulic turbine unit adapted to yield infinitely variable speeds between the shafts, direct drive coupling means adapted to yield forward speed drive only between said shafts, alternately operated controls effective to establish the couple of said unit or said means, power means for actuating said controls, a member controlling said power means, and a single manual means arranged to operate said member whereby said power means establishes reduction speed ratios or direct drive ratio between said shafts at the will of the operator.

7. In the combination of claim 6, a cam embodied in the manual means for positioning the member controlling said power means, with predetermined movement of said manual means.

8. In the combination of claim 6, fluid pressure actuating devices in said power means, and a valve moved by said member and made operative by movement of said manual means.

9. In motor vehicle drives, in combination, driving and driven members, a direct drive between said members including a friction clutch with disengageable rotary elements, a reduction speed drive for establishing driving connection between said members and including a fluid torque converter unit driving through a one-way clutch, and a unitary mastering control for both said drives effective upon predetermined operator movement, to alternate the drive between direct through said friction clutch, and reduction speed ratio through said unit and said one-way clutch.

10. In motor vehicle controls, in combination, a variable speed transmission coupling said shafts embodying a direct driving clutch and a reduction speed ratio driving clutch, a clutch shifter means adapted to alternate the drive of said clutches, a common actuator for said clutches including a single disc-like spring operated by said shifter means, control means for said actuator normally biased to engage one clutch while holding the other disengaged, and manually operable means to set aside said biasing of one clutch while engaging the other clutch.

11. In the combination of claim 2, alternately operable friction clutches included in said clutching means, actuated by said fluid pressure means and controlled by said valve and said manual control.

12. In the combination of claim 2, friction clutch members in both said clutches, arranged to be alternately actuated by a single actuator mechanism and loaded during engagement by a single loading means.

13. In the combination of claim 2, porting of said valve with respect to the said source and the said actuation means, effective when said valve is moved to one position to cause engagement of one of said clutches with release of the other of said clutches, and movable to another position to cause disengagement of the first-named of said clutches and engagement of the other of said clutches.

14. In the combination of claim 2, additional coupling means located in the path of torque between the said torque converter and the said load shaft and a control for said additional coupling means adapted to coact with the said manual control for said valve, such that the coupling means control is permitted to act only when the valve control is placed in a predetermined position.

HANS O. SCHJOLIN.